(12) United States Patent
Murthy et al.

(10) Patent No.: US 11,237,943 B2
(45) Date of Patent: Feb. 1, 2022

(54) GENERATING INPUTS FOR COMPUTER-PROGRAM TESTING

(71) Applicant: FUJITSU LIMITED, Kawasaki (JP)

(72) Inventors: Praveen Murthy, Fremont, CA (US); Quoc-Sang Phan, Mountain View, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/297,208

(22) Filed: Mar. 8, 2019

(65) Prior Publication Data

US 2020/0285563 A1 Sep. 10, 2020

(51) Int. Cl.
G06F 11/36 (2006.01)

(52) U.S. Cl.
CPC ...... G06F 11/3612 (2013.01); G06F 11/3604 (2013.01); G06F 11/3688 (2013.01)

(58) Field of Classification Search
None
See application file for complete search history.

(56) References Cited

U.S. PATENT DOCUMENTS

| | | | |
|---|---|---|---|
| 2009/0199168 A1* | 8/2009 | Hamada | G06F 8/443 717/151 |
| 2012/0222013 A1* | 8/2012 | Zheng | G06F 11/3612 717/125 |
| 2013/0104106 A1* | 4/2013 | Brown | G06F 11/3696 717/124 |
| 2017/0220455 A1* | 8/2017 | Badran | G06F 11/3684 |
| 2019/0089720 A1* | 3/2019 | Aditham | H04L 9/3239 |
| 2019/0258803 A1* | 8/2019 | Murthy | G06F 11/3688 |

OTHER PUBLICATIONS

Bohme, et al., Coverage-based Greybox Fuzzing as Markov Chain, School of Computing, National University of Singapore, 2016, pp. 1032-1043.
Godefroid, et al., Learn & Fuzz: Machine Learning for Input Fuzz, ASE, 2017, 18 pages.

* cited by examiner

*Primary Examiner* — Lewis A Bullock, Jr.
*Assistant Examiner* — Mark A Gooray
(74) *Attorney, Agent, or Firm* — Maschoff Brennan (57) ABSTRACT

According to an aspect of an embodiment, a method may include obtaining a computer-readable program and analyzing the computer-readable program to identify a constant in code of the computer-readable program. The method may also include obtaining context data associated with the constant from a portion of the code that includes an occurrence of the constant. The method may also include determining a location in the computer-readable program of the occurrence of the constant and analyzing the context data to identify a property of potential inputs to the computer-readable program at the location. The method may also include generating an input for the computer-readable program based on the constant and the identified property and providing the generated input to the computer-readable program during execution of the computer-readable program when execution of the computer-readable program reaches the location.

20 Claims, 5 Drawing Sheets

GENERATING INPUTS FOR COMPUTER-PROGRAM TESTING

FIELD

The embodiments discussed in the present disclosure are related to generating inputs for computer-program testing.

BACKGROUND

Computer programs may be used in many industries. To help reduce errors in computer programs that may result in problems in systems deploying computer programs, the computer programs may be tested and/or debugged.

The subject matter described in the present disclosure is not limited to embodiments that solve any disadvantages or that operate only in environments such as those described above. Rather, this background is only provided to illustrate one example technology area where some embodiments described in the present disclosure may be practiced.

SUMMARY

One embodiment of the present disclosure may include a method that includes obtaining a computer-readable program and analyzing the computer-readable program to identify a constant in code of the computer-readable program. The constant may have a constant value in the code of the computer-readable program. The method may also include obtaining context data associated with the constant from a portion of the code that includes an occurrence of the constant. The method may also include determining a location in the computer-readable program of the occurrence of the constant. The method may also include analyzing the context data in relation to the constant value to identify a property of potential inputs to the computer-readable program at the location. The method may also include generating an input for the computer-readable program based on the constant value and the identified property. The method may also include providing the generated input to the computer-readable program during execution of the computer-readable program when execution of the computer-readable program reaches the location.

One or more of the objects and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

A computer-readable program may be tested using automated testing operations. Automated testing operations may include executing computer-readable program a number of times using different inputs each time. The execution of the computer-readable program may be observed for outputs, operations, crashes, hangs, stalls, or other behaviors. The observations may be expected as the observations may be according to the intent of the developers of the computer-readable program. Alternatively or additionally, the observations may be unexpected as the observations may not be according to the intent of the developers. In some cases, the purpose of the automated testing operations may be to identify unexpected behaviors, or inputs that cause unexpected behaviors, which may relate to errors, bugs, or vulnerabilities in the computer-readable program. In some cases, testing some or all branches of the computer-readable program may be a purpose of the automated testing operations.

Some automated testing operations may include randomly generating multiple inputs for the computer-readable program. Completely random generation of inputs may result in slower testing of a computer-readable program than other methods. For example, if inputs are generated completely randomly, a number of executions of the computer-readable program with different inputs before an unexpected behavior occurs may be larger than a number of executions where the inputs are not generated completely randomly.

Random generation of inputs may include mutating, or randomly altering, a valid input or part of a valid input to generate a different input. For example, one or more random values may be inserted into or appended onto a valid input to generate a different input. Mutating inputs may be an improvement over completely-random-input generation because the execution of the computer-readable program may accept the valid portions of the inputs which may cause the execution of the computer-readable program to proceed to basic blocks of the computer-readable program where the random portion of the input may be used as an input. In contrast, completely-random-input generation may take more completely random inputs to discover an input that would cause the execution of the computer-readable program to reach the same basic blocks.

The systems and methods of the present disclosure may relate to the generation of context-based inputs for automated computer-program testing operations. Generating context-based inputs may be an improvement over generating completely randomly inputs and mutated inputs because context-based inputs may have a higher probability of being accepted by an execution of the computer-readable program as a valid input. Alternatively or additionally, context-based inputs may have a higher probability of causing the computer-readable to execute by proceeding to a different basic block of the computer-readable program.

For example, at a particular basic block of a computer-readable program, an execution of the computer-readable program may only accept a certain input. An automated computer-readable program testing operation using completely random input generation may generate hundreds, thousands, or even millions of inputs before generating the certain input. An automated computer-readable program testing operation mutating known valid inputs may generate the certain input faster than completely random input generation when the certain input is related to a known valid input. An automated computer-readable program testing operation using context-based inputs may generate the certain input faster than either completely random input generation or mutating known valid inputs by analyzing the computer-readable program to identify properties related to inputs for the particular basic block of the computer-readable program. Alternatively or additionally, the automated computer-readable program testing operations using context-based inputs may generate the certain input more quickly than the automated computer-readable program testing operations using mutating where the certain input is not related to a known valid input.

As another example, at a particular basic block of a computer-readable program an execution of the computer-readable program using a certain input may cause an unintended execution of certain portions of the computer-readable program. The unintended execution of certain portions of the computer-readable program may represent a vulnerability in the computer-readable program. Exposing vulnerabilities may be a purpose of the testing operations. An automated computer-readable program testing operation using context-based inputs may generate the certain input faster than either completely random input generation or mutating known valid inputs by analyzing the computer-readable program to identify properties related to inputs for the particular basic block of the computer-readable program.

Therefore, the systems and methods of the present disclosure may include improvements in the technical field of software testing, and/or automated software testing. The improvements may include at least an increase in efficiency of automated software testing.

Additionally or alternatively, the systems and methods of the present disclosure may provide improvements to implementations of automated computer-readable program testing operations by identifying inputs that are acceptable, that advance the execution of the computer-readable program more quickly, or that reduce computing time and/or energy.

Additionally or alternatively, the systems and methods of the present disclosure may allow computer performance of functions not previously performable by a computer, including generating inputs that may have a higher probability of being accepted by an execution of a computer-readable program. Additionally or alternatively, the systems and methods of the present disclosure may allow computer performance of functions not previously performable by a computer, including generating inputs that may have a higher probability of exposing vulnerabilities in a computer-readable program. Additionally or alternatively, the systems and methods of the present disclosure may allow a computer to identifying properties of an input to the computer-readable program from an analysis of the computer-readable program.

Figure 1:
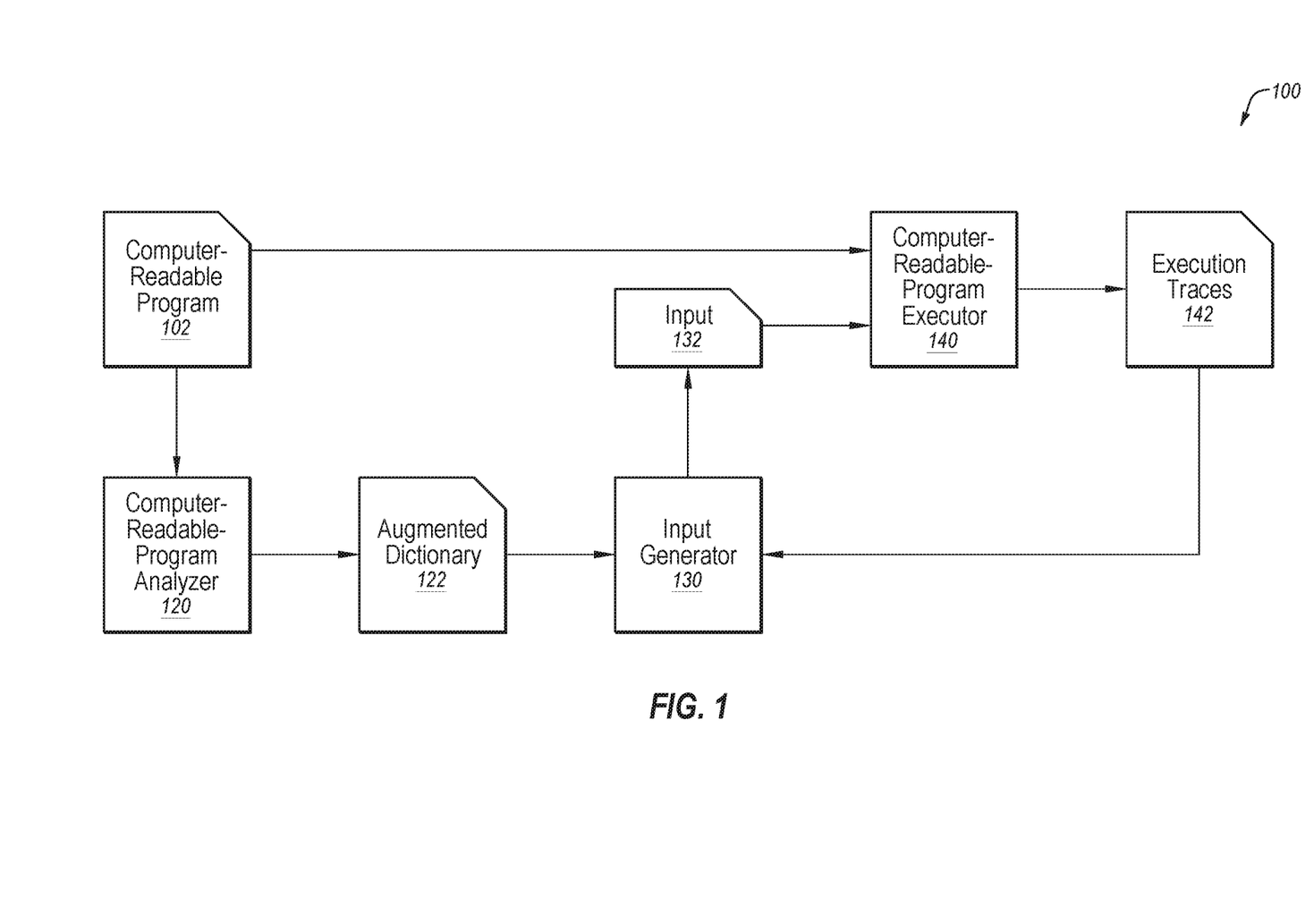
FIG. 1 is a block diagram of an example environment that generates inputs for automated computer-program testing operations.

FIG. 1 is a block diagram of an example environment 100 for generating inputs 132 for automated computer-program testing operations. The environment 100 may include a computer-readable program analyzer 120, an input generator 130, and a computer-readable program executor 140.

In some embodiments, in general, the computer-readable program analyzer 120 may analyze a computer-readable program 102 to generate an augmented dictionary 122. The input generator 130 may use the augmented dictionary 122 to generate inputs 132. In these and other embodiments, the computer-readable program executor 140 may execute the computer-readable program 102 using the inputs 132 or other inputs. The computer-readable program executor 140 may generate execution traces 142 based on the execution of the computer-readable program 102 using the inputs 132 or other inputs. The input generator 130 may use the execution traces 142 to determine when to generate additional inputs 132. Alternatively or additionally, the input generator 130 may determine the additional inputs 132 based on the inputs 132 that result in the execution traces 142.

In some embodiments, the computer-readable program 102 may be any suitable computer-readable program in any suitable format. The computer-readable program 102 may include developer's code, disassembly code, assembly code, machine code, an executable binary and/or any other representation of instructions to be performed by a computer. The computer-readable program 102 may include code under test, a binary program under analysis, and/or an unknown binary program.

As indicated, in some embodiments, the computer-readable program analyzer 120 may be configured to analyze the computer-readable program 102 to generate the augmented dictionary 122. The analysis of the computer-readable program 102 may include identifying a constant, obtaining context data for the constant, determining a location of the constant in the computer-readable program 102, and/or identifying properties of potential inputs to the computer-readable program 102 at the location. Additional detail regarding the analysis of the computer-readable program 102 is discussed with regard to the process 200 of FIG. 2.

In some embodiments, the augmented dictionary 122 may include one or more constants and data related to each of the constants. For example, the augmented dictionary 122 may include a constant identified by the computer-readable program analyzer 120 in the computer-readable program 102. The constant may include a constant value that may be initialized in the code of the computer-readable program 102 (for example through a definition or a declaration). The augmented dictionary 122 may further include context data associated with the constant. The context data may be from one or more portions of code of the computer-readable program 102 that include one or more occurrences of the constant. The augmented dictionary 122 may also include one or more locations in the computer-readable program 102 of occurrences of the constant in the computer-readable program 102. The locations may include locations in code of the computer-readable program 102. Additionally or alternatively, the locations may include locations in an executable version of the computer-readable program 102. The locations may be recognizable in an execution trace or during an execution of the computer-readable program 102. The augmented dictionary 122 may further include one or more properties of potential inputs of the computer-readable program 102. Each of the constants, including the constant values, the context data, and the properties of potential inputs may be associated with the locations of the computer-readable program 102 as included in the augmented dictionary 122. Additional detail regarding the contents of the augmented dictionary 122 is provided below with regard to the constants 212, the context data 222, the properties 232, and the locations 252 of FIG. 2.

As indicated, in some embodiments, the input generator 130 may be configured to use the augmented dictionary 122 to generate the inputs 132. For example, the input generator 130 may be configured to generate the inputs 132 based on the constant values and the properties included in the augmented dictionary 122. In some embodiments, each of the inputs 132 may each correspond to a location in the computer-readable program 102. In some embodiments, each of the inputs 132 may correspond to a different location. Alternatively or additionally, some of the inputs 132 may correspond to the same location and others of the inputs may correspond to different locations. An input 132 corresponding to a location in the computer-readable program 102 may indicate that the input may be provided to the computer-readable program 102 when execution of the computer-readable program 102 reaches the location in the computer-readable program 102.

In some embodiments, the inputs 132 may include numbers, values, characters, strings, or other information configured to be input into the computer-readable program 102.

As indicated, in some embodiments, the computer-readable program executor 140 may be configured to execute the computer-readable program 102. The computer-readable program executor 140 may be configured to execute the computer-readable program 102 using the inputs 132, other inputs, or no inputs. Based on the execution of the computer-readable program 102 using the inputs 132, the computer-readable program executor 140 may be configured to generate the execution traces 142. In some embodiments, the computer-readable program executor 140 may be configured to execute the computer-readable program 102 using the inputs 132 to test the computer-readable program 102. The execution of the computer-readable program 102 using the inputs 132 may test the computer-readable program 102 by observing the behaviors of the computer-readable program 102 during execution of the computer-readable program 102. In these and other embodiments, the computer-readable program executor 140 may be configured to observe and/or record outputs, operations, crashes, hangs, stalls, or other behaviors of the computer-readable program 102. The behaviors of the computer-readable program 102 may indicate how the computer-readable program 102 performs in the testing.

In some embodiments, the execution traces 142 may include locations within the computer-readable program 102 executed by one or more executions of the computer-readable program 102. For example, an execution trace 142 may include a trace of all of the locations or basic blocks executed during a particular execution of the computer-readable program 102 using a particular one or more of the inputs 132. Each of the execution traces 142 may thus be associated with a particular one or more of the inputs 132 that results in the corresponding execution trace 142.

In some embodiments, the computer-readable program executor 140 may select which one of the inputs 132 to provide to the computer-readable program 102 during execution of the computer-readable program 102 based on locations reached during execution of the computer-readable program 102. For example, the computer-readable program executor 140 may maintain which basic block is currently being executed and the particular location of the basic block in the computer-readable program 102. The computer-readable program executor 140 may compare the particular location to locations corresponding to the inputs 132. If the particular location of the execution of the computer-readable program 102 corresponds to a location of a particular input of the inputs 132, the computer-readable program executor 140 may select the particular input and may provide the particular input to the execution of the computer-readable program 102 for use during execution of the computer-readable program 102 at that location.

In some embodiments, the input generator 130 may use the execution traces 142 to generate additional inputs 132. For example, the input generator 130 may analyze an execution trace 142 and an input associated with the execution trace 142 to identify a particular parts of the input that causes the execution of the computer-readable program 102 to reach a particular location included in the augmented dictionary 122. The input generator 130 may modify the particular parts of the input based on properties and/or a constant value corresponding to the particular location in the augmented dictionary 122.

In some embodiments, the input generator 130 and the computer-readable program executor 140 may operate together to generate additional inputs 132 for an ongoing execution of the computer-readable program 102. For example, the computer-readable program executor 140 may begin executing the computer-readable program 102 using a first one of the inputs 132. The computer-readable program executor 140 may generate an execution trace 142 of the ongoing execution. The input generator 130 may take the execution trace 142 of the ongoing execution and compare the locations in the execution trace 142 to locations in the augmented dictionary 122. Based on a correspondence between a location reached by the ongoing execution and a location in the augmented dictionary 122, the input generator 130 may generate a second one of the inputs 132 that may be used by the computer-readable program executor 140 in the ongoing execution.

In some embodiments, the input generator 130 may generate an input 132 based on the satisfaction of a condition by an execution of the computer-readable program 102 by the computer-readable program executor 140. For example the input generator 130 may generate inputs based on the locations in the execution traces 142 satisfying a condition. For example, an execution of the computer-readable program 102 may execute a particular basic block of code at a particular location of the computer-readable program 102 and then not proceed to another basic block. If the execution does not proceed to another basic block for a threshold duration of time a condition may be satisfied. In response to the satisfaction of the condition, the computer-readable program executor 140 may send an execution trace 142, including the particular location, to the input generator 130. The input generator 130 may generate a particular input 132 in response to the satisfaction of the condition and based on information from the augmented dictionary 122 that corresponds to the particular location. In some embodiments, the particular input 132 may be provided to an ongoing execution of the computer-readable program 102. In these or other embodiments, the execution may be terminated and the particular input may be provided to a new execution of the computer-readable program 102.

In these or other embodiments, the input generator 130 and the computer-readable program executor 140 may operate together to generate additional inputs 132 for a subsequent execution of the computer-readable program 102. For example, the computer-readable program executor 140 may execute the computer-readable program 102 using a first one of the inputs 132. The input generator 130 may compare the locations reached by the execution of the computer-readable program 102 using the first one of the inputs 132 to locations in the augmented dictionary 122. In response to one of the locations reached by the execution of the computer-readable program 102 corresponding to a particular location in the augmented dictionary 122, the input generator 130 may generate a second one of the inputs 132 based on information from the augmented dictionary 122 that corresponds with the particular location. For example, the second one of the inputs 132 may be based on a constant value of a constant that is associated with the particular location. Additionally or alternatively, the second one of the inputs 132 may be based on a property associated with the constant.

Additionally or alternatively, the second one of the inputs 132 may be based on and/or include the first one of the inputs 132. For example, the second one of the inputs 132 may include the first one of the inputs 132 as adjusted based on the information in the augmented dictionary 122 that corresponds with the particular location. The second one of the inputs 132 may be used in a subsequent execution of the computer-readable program 102 by the computer-readable program executor 140.

Figure 4:
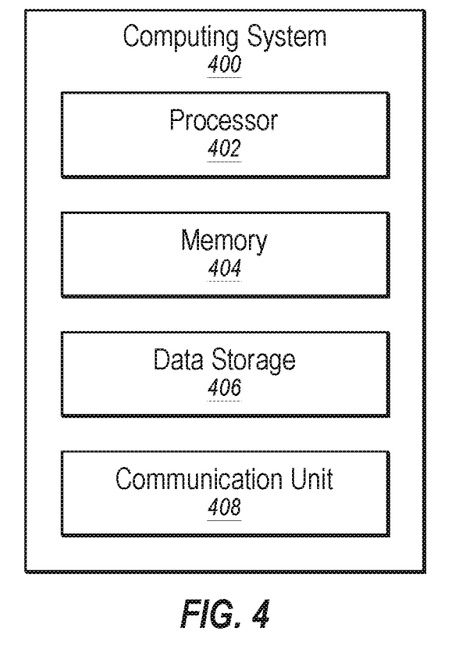
FIG. 4 is a block diagram of an example computing system, all according to at least one embodiment described in the present disclosure.

In some embodiments one or more of the computer-readable program analyzer 120, the input generator 130, and the computer-readable program executor 140 may include code and routines configured to enable a computing system, such as the computing system 400 of FIG. 4, to perform one or more operations related to analyzing a computer-readable program, generating inputs for the computer-readable program, and/or executing the computer-readable program. Additionally or alternatively, one or more of the computer-readable program analyzer 120, the input generator 130, and the computer-readable program executor 140 may be implemented using hardware including a processor, a microprocessor (e.g., to perform or control performance of one or more operations), a field-programmable gate array (FPGA), and/or an application-specific integrated circuit (ASIC) such as the processor 402 of FIG. 4. In some other instances, one or more of the computer-readable program analyzer 120, the input generator 130, and the computer-readable program executor 140 may be implemented using a combination of hardware and software. In the present disclosure, operations described as being performed by one or more of the computer-readable program analyzer 120, the input generator 130, and the computer-readable program executor 140 may include operations that one or more of the computer-readable program analyzer 120, the input generator 130, and the computer-readable program executor 140 may direct a system to perform.

Modifications, additions, or omissions may be made to the environment 100 without departing from the scope of the present disclosure. For example, in some embodiments the identification of properties may be performed by, or related to the input generator 130 instead of, or in addition to what is performed by the computer-readable program analyzer 120. Further, the order of operations may vary according to different implementations.

Figure 2:
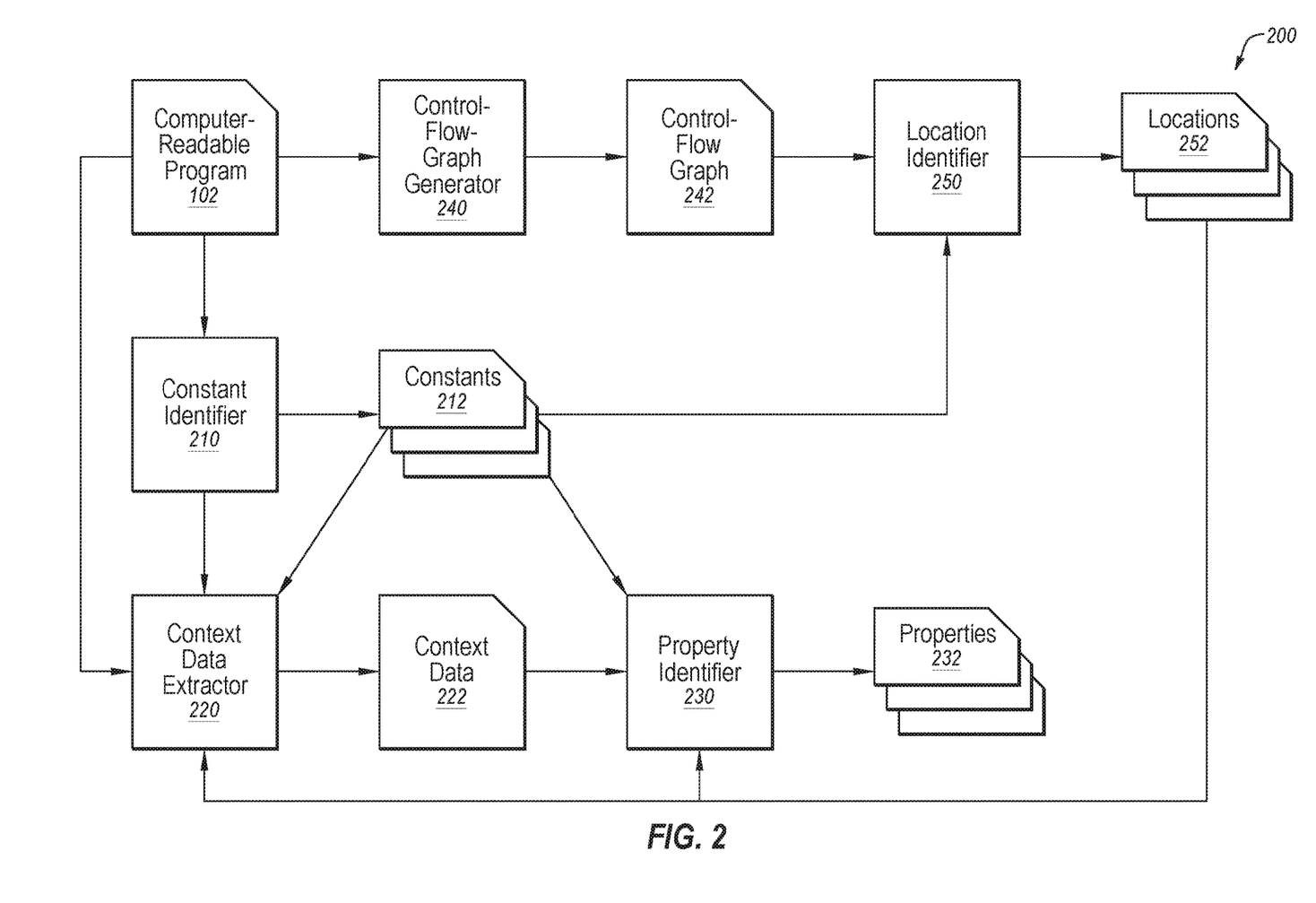
FIG. 2 is a block diagram of an example environment to analyze a computer-readable program.

FIG. 2 is a block diagram of an example environment 200 for analyzing the computer-readable program 102. The environment 200 may include a constant identifier 210, a context-data extractor 220, a property identifier 230, a control-flow-graph generator 240, and a location identifier 250.

In some embodiments, in general, the constant identifier 210 may identify constants 212 of the computer-readable program 102. The context-data extractor 220 may extract context data 222 from the computer-readable program 102 based on the constants 212 and the computer-readable program 102. The property identifier 230 may generate properties 232 based on the context data 222 and the constants 212. Additionally or alternatively, the control-flow-graph generator 240 may generate a control-flow graph 242 based on the computer-readable program 102. The location identifier 250 may identify locations 252 of the constants 212 relative to the control-flow graph 242 and/or the computer-readable program 102.

In some embodiments, the environment 200 may perform one or more operations that may be related to the computer-readable program analyzer 120 of FIG. 1. Additionally or alternatively, each of the constants 212, the context data 222, the properties 232, the control-flow graph 242, and/or the locations 252 may be included in the augmented dictionary 122 of FIG. 1.

As indicated, in some embodiments, the constant identifier 210 may be configured to identify constants 212 in the computer-readable program 102. In some embodiments, the constants 212 may include names of constant variables as they appear in code of the computer-readable program 102 and values to which the constant variables are initialized in the code. For example, the constant identifier 210 may parse one or more embodiments of the computer-readable program 102. For example, the constant identifier 210 may parse through disassembly code, and/or developer code to identify the constants 212 and constant values to which the constants 212 have been initialized. In some embodiments, the constant identifier 210 may search through a read-only-data section of disassembly code to identify the constants 212. The constant identifier 210 may identify the constants 212 based on syntax of the code, for example, a constants 212 may be initialized with a constant value using a keywords, for example, "const" or "#DEFINE."

As indicated, in some embodiments, the context-data extractor 220 may be configured to extract context data 222 from the computer-readable program 102. The context-data extractor 220 may obtain a location in the code of the computer-readable program 102 of the constants 212. For example, the context-data extractor 220 may be configured to parse the computer-readable program 102 for occurrences of the constants 212. Additionally or alternatively, the constant identifier 210 may obtain the locations of the constants 212 in the code of the computer-readable program 102 from another source, for example, the locations 252 from the location identifier 250.

The context-data extractor 220 may be configured to identify portions of code, for example, lines of code including occurrences of the constant and lines of code adjacent to the occurrences of the constants 212, as context data 222. For example, a line of code subsequent to an-occurrence of a constant may or may not relate to an error message or error protocol. The fact that the subsequent line of code includes or does not include an error message or error protocol may be identified as part of the context data 222.

In some embodiments, the context data 222 may include one or more lines of code of the computer-readable program 102 that relate to and/or include the constants 212. In some embodiments, the context data 222 may include lines of code related to multiple occurrences of the constants 212 throughout the computer-readable program 102. In these or other embodiments, the context data 222 may include an aggregation of lines of code associated with the multiple occurrences, for example, lines of code common to more than one of the multiple occurrences may be included in the context data 222.

The context-data extractor 220 may be configured to compare the lines of code with other known context data, or common code patterns to determine the context data 222 and/or context data 222 that is particularly relevant. For example, the context-data extractor 220 may obtain lines of code that include an occurrence of the constant in code of the computer-readable program 102. The context-data extractor 220 may obtain example lines of code that are known to be context data or particularly relevant context data relative to another constant and another computer-readable program. The context-data extractor 220 may compare the lines of code obtained from the computer-readable program 102 to the example lines of code. Based on a similarity between the lines of code and the example lines of code, the context-data extractor 220 may identify the lines of code as context data 222 and/or particularly relevant context data 222.

As indicated, in some embodiments, the property identifier 230 may identify properties 232 relative to the constants 212. In some embodiments, the properties 232 may include properties of potential inputs to the computer-readable program 102 based on the constants 212. For example, the properties 232 may include information that may be used by the input generator 130 of FIG. 1 to generate the inputs 132 of FIG. 1. Examples of the properties 232 include such things as an input length, a numerical range, and an input format. The inputs 132 may be generated according to the properties 232, for example, if the properties 232 includes an input length, one or more of the inputs 132 may have a length less than or equal to the input length. Additionally or alternatively, one or more of the inputs 132 may have a length that exceeds the input length. An input having a length that exceeds the input length may be intended to test whether the computer-readable program 102 will properly reject the input.

The properties 232 may be based on the constant values of the constants 212. For example, the constant value may be a number that may indicate the number of characters in a proper input, or the input length. Additionally or alternatively, the context data 222 may be used to identify that the constant value is the input length and not a numerical range or a format.

The properties 232 may be associated with the locations of one or more occurrences of the constants 212 in the computer-readable program 102. Additionally or alternatively, the properties 232 may be associated with the locations of the constants 212 in an executable version of the computer-readable program 102. For example, each of the properties 232 may be associated with a location recognizable during an execution of the computer-readable program 102. The association between a location in and a property 232 may allow for an input based on the property 232 to be provided to an execution of the computer-readable program 102 when the execution reaches the location associated with the property 232.

In some embodiments, the property identifier 230 may identify the properties 232 based on the context data 222. For example, the property identifier 230 may compare the context data 222 to other context data and/or strings to determine the properties 232. In some embodiments, the property identifier 230 may use a machine-learning technique to determine the properties 232. For example, the property identifier 230 may compare the context data 222 to other context data that is associated with a known property. Thereby, the property identifier 230 may determine a property 232 based on a similarity between the context data 222 and the known property.

As indicated, in some embodiments, the control-flow-graph generator 240 may be configured to generate the control-flow graph 242 based on the computer-readable program 102. In some embodiments, the control-flow graph 242 may include a representation of basic blocks and/or branches of the computer-readable program 102. The control-flow graph 242 may include a mapping of locations of one embodiment of the computer-readable program 102 to another embodiment of the computer-readable program 102. For example, the control-flow graph 242 may include a mapping of lines of developer code to locations observable during execution and/or in an execution trace.

As indicated, in some embodiments, the location identifier 250 may be configured to identify locations 252 of the constants 212. In some embodiments, the locations 252 may include locations of occurrences of the constants 212 or basic blocks that include the occurrences of the constants 212 that are recognizable at execution and/or in an execution trace. In some embodiments, the location identifier 250 may identify basic blocks in the executable binary that include occurrences of the constants 212 based on the mapping in the control-flow graph 242. Additionally or alternatively, the location identifier 250 may identify locations in the code of the computer-readable program 102 that include occurrences of the constants 212. Thus, the locations 252 may include locations in the code of occurrences of the constants 212. The location identifier 250 may identify the locations in the code based on the control-flow graph 242 and a correspondence between the control-flow graph 242 and the code.

In some embodiments, the location identifier 250 may limit the number of basic blocks in the control-flow graph 242 which it considers when identifying the locations 252 of the constants 212 in the computer-readable program 102. For example, the location identifier 250 may analyze the control-flow graph 242 and/or the computer-readable program 102 to determine a number of basic blocks that are not dependent on the input. For example, the location identifier 250 may perform a taint analysis or similar analysis to determine the basic blocks that are not modified based on an input. In these and other embodiments, the location identifier 250 may not to consider the basic blocks that are not input dependent when identifying the locations 252.

In some embodiments, the context-data extractor 220 may receive the locations 252 from the location identifier 250. The context-data extractor 220 may use the locations 252 to identify lines of code that include occurrences of the constants 212 to generate the context data 222. Additionally or alternatively, the context-data extractor 220 may identify the context data 222 without using the locations 252 generated by the location identifier 250.

Additionally or alternatively, the property identifier 230 may receive the locations 252 from the location identifier 250. The property identifier 230 may use the locations 252 to associate the properties 232 with the locations 252. The association between the properties 232 and the locations 252 may be such that during execution, or in an execution trace, a location executed may be associated with a property 232.

In some embodiments one or more of the constant identifier 210, the context-data extractor 220, the property identifier 230, the control-flow-graph generator 240, and the location identifier 250 may include code and routines configured to enable a computing system, such as the computing system 400 of FIG. 4, to identify constants of a computer-readable program, extract context data of the constants from the computer-readable program, identify properties of inputs to the computer-readable program based on the constants and the context data of the constants, generate a control-flow graph, and identify locations of the constants relative to the control-glow graph. Additionally or alternatively, one or more of the constant identifier 210, the context-data extractor 220, the property identifier 230, the control-flow-graph generator 240, and the location identifier 250 may be implemented using hardware including a processor, a microprocessor (e.g., to perform or control performance of one or more operations), a field-programmable gate array (FPGA), and/or an application-specific integrated circuit (ASIC) such as the processor 402 of FIG. 4. In some other instances, one or more of the constant identifier 210, the context-data extractor 220, the property identifier 230, the control-flow-graph generator 240, and the location identifier 250 may be implemented using a combination of hardware and software. In the present disclosure, operations described as being performed by one or more of the constant identifier 210, the context-data extractor 220, the property identifier 230, the control-flow-graph generator 240, and the location identifier 250 may include operations that one or more of the constant identifier 210, the context-data extractor 220, the property identifier 230, the control-flow-graph generator 240, and the location identifier 250 may direct a system to perform.

Modifications, additions, or omissions may be made to the system 200 without departing from the scope of the present disclosure. For example, in some embodiments the location identifier 250 may identify locations of the constants 212 in the computer-readable program 102 without the control-flow graph 242. In these or other embodiments, the control-flow-graph generator 240 may be omitted. For another example, in some embodiments, the context-data extractor 220 may identify the locations of the occurrences of the constants 212 based on the locations 252. For example, the context-data extractor 220 may obtain lines of code for the context data 222 from one or more locations in the developer code that correspond to the locations 252 identified by the location identifier 250. For another example, the property identifier 230 may associate the properties 232 with locations recognizable during an execution, or in an execution trace, based on the context data 222, which may include location information. Further, the order of operations may vary according to different implementations.

An example of the operation of the environment 100 of FIG. 1 and the environment 200 of FIG. 2, and the relationship between the environment 100 and the environment 200 is now provided. In this example, a computer-readable program 102 may be obtained. The computer-readable program 102 may be a binary program under analysis. The computer-readable program 102 may be tested for bugs, defects or vulnerabilities. The testing may include executing all or multiple branches within the computer-readable program 102. Additionally or alternatively, the testing may include executing different branches with many different inputs to attempt to find an input that may cause the execution of the computer-readable program 102 to behave unexpectedly. The computer-readable program 102 may be analyzed by the computer-readable program analyzer 120. The results of the analysis of the computer-readable program 102 may include the constants 212, the context data 222, the properties 232, and the locations 252, any or all of which may be included in the augmented dictionary 122. The input generator 130 may use the augmented dictionary 122 to generate the inputs 132. The computer-readable program executor 140 may execute the computer-readable program 102 using the inputs 132. While executing the computer-readable program 102, the computer-readable program executor 140 may generate the execution traces 142. The input generator 130 may use the execution traces 142 to generate additional inputs 132.

As another example of the operation of the environment 100 of FIG. 1 and of the environment 200 of FIG. 2, a computer-readable program 102 may be obtained. The computer-readable program 102 may include a binary program under analysis. The computer-readable program 102 may be disassembled. Further, based on the disassembled computer-readable program 102, the control-flow-graph generator 240 of FIG. 2 may build a control-flow graph.

In these and other embodiments, the computer-readable program 102 may be analyzed to identify constant values by parsing a read-only-data section of disassembly code of the computer-readable program 102. For example, the computer-readable program 102 may include a line of code "#DEFINE MAX_INT 255;". The constant identifier 210 may analyze the disassembly code of the computer-readable program 102 to identify the line of code as a line of code that includes a constant. The constant identifier 210 may determine that "MAX_INT" is a constant 212 and "MAX_INT" is initialized to have a constant value of "255."

The control-flow graph 242 may be analyzed to determine which basic blocks of the control-flow graph 242 depend on inputs and which basic blocks do not depend on inputs. Memory locations of the constants 212 may be mapped to basic blocks in the control-flow graph 242. The mapping may be such that during an execution of the computer-readable program 102, or in an execution trace, the locations of the constants 212 in the code may be recognizable. For example, the code of the computer-readable program 102 may include a line of code including a condition "if (input<MAX_INT)." A basic block in the control-flow graph 242 that corresponds to the line of code may be identified such that during execution, or in an execution trace, the line of code may be recognizable. The basic blocks in the control-flow graph 242 and the constant values may be stored in a dictionary file.

The computer-readable program 102 may be analyzed to identify occurrences of the constant 212 in the code of the computer-readable program 102. Lines of code adjacent to the occurrences of the constant 212 may be analyzed to identify context data. For example, a line of code such as "if (input<MAX_INT), may be analyzed to determine that the line includes occurrences of the constant "MAX_INT" and context data 222 "if (input<MAX_INT)" related to the constant MAX_INT." The property identifier 230 may analyze the context data 222 and/or the constants 212 to identify properties of potential inputs to the computer-readable program 102. For example, the property identifier 230 may analyze the constant "MAX_INT" and the context data "if (input<MAX_INT)" to determine that the input must be less than two hundred fifty-five. The properties 232 may be stored in the dictionary.

The input generator 130 may generate specific inputs 132 for the locations 252 of the computer-readable program 102 based on the properties 232. For example, the specific inputs 132 may include a numerical value that is less than two hundred fifty-five and may be related to the locations 252 identified in the control-flow graph 242. In some embodiments, during an execution of the computer-readable program 102, if the execution reaches a basic block that is related so a specific input 132, the execution may provide the specific input 132 to the execution.

For example, the computer-readable program executor 140 may execute the computer-readable program 102. The computer-readable program executor 140 may observe the locations reached during the execution of the computer-readable program 102. The computer-readable program executor 140 may provide the specific inputs 132 to the execution of the computer-readable program 102 when the execution reaches locations 252 related to the specific inputs 132.

Additionally or alternatively, the computer-readable program executor 140 may execute the computer-readable program 102 and generate the execution traces 142. The input generator 130 may obtain the execution traces 142 and generate inputs based on the execution traces 142 and the properties 232 with the corresponding locations 252. For example, the input generator 130 may identify a particular input that may cause the execution to reach a particular location. The input generator 130 may modify the particular input to include an input portion based on the properties 232 that correspond to the particular location. The computer-readable program executor 140 may execute the computer-readable program 102 using the modified particular input.

Figure 3A:
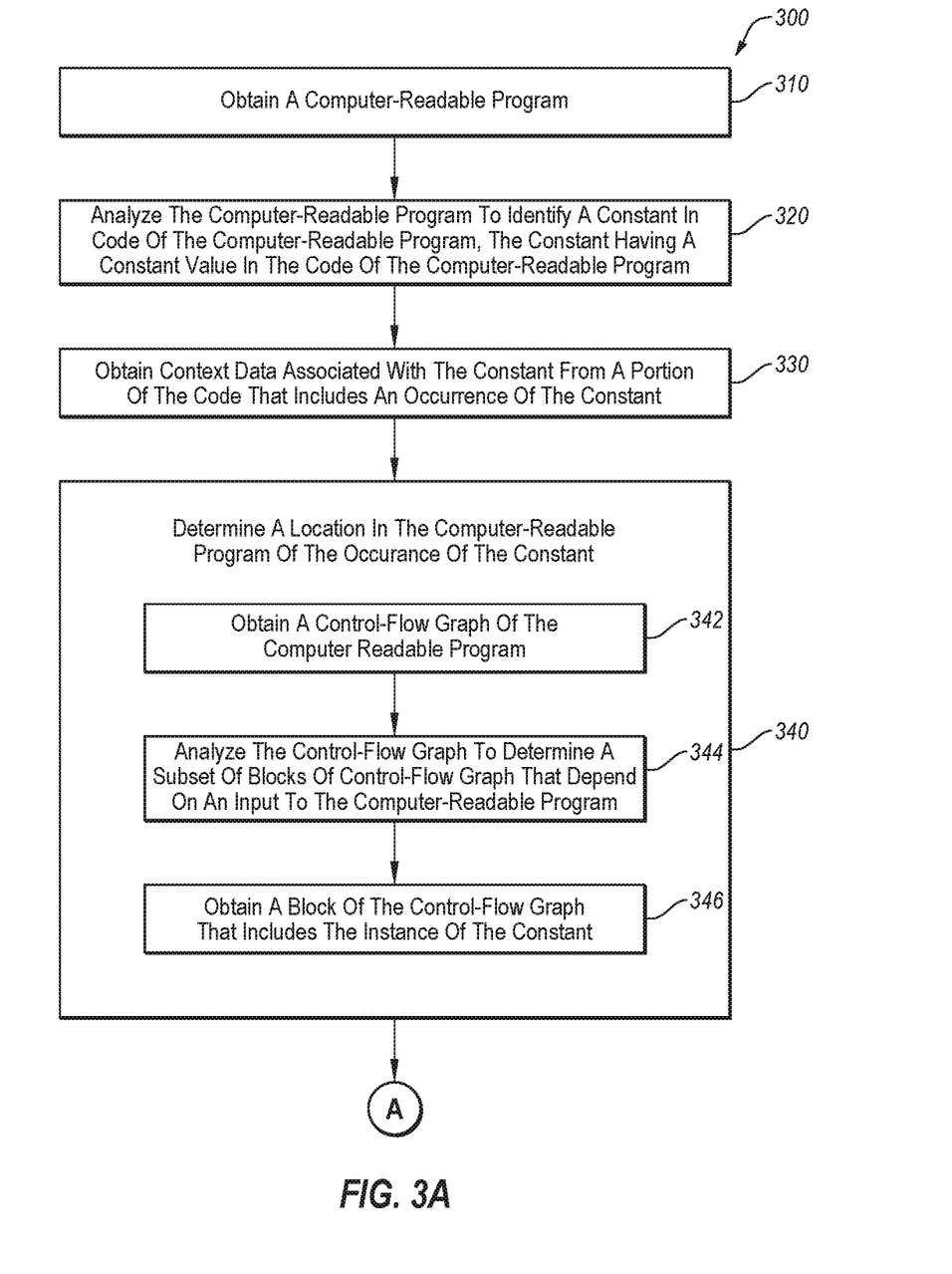
FIGS. 3A-B include a flow chart of an example method to generate inputs for automated computer-program testing operations.
Figure 3B:
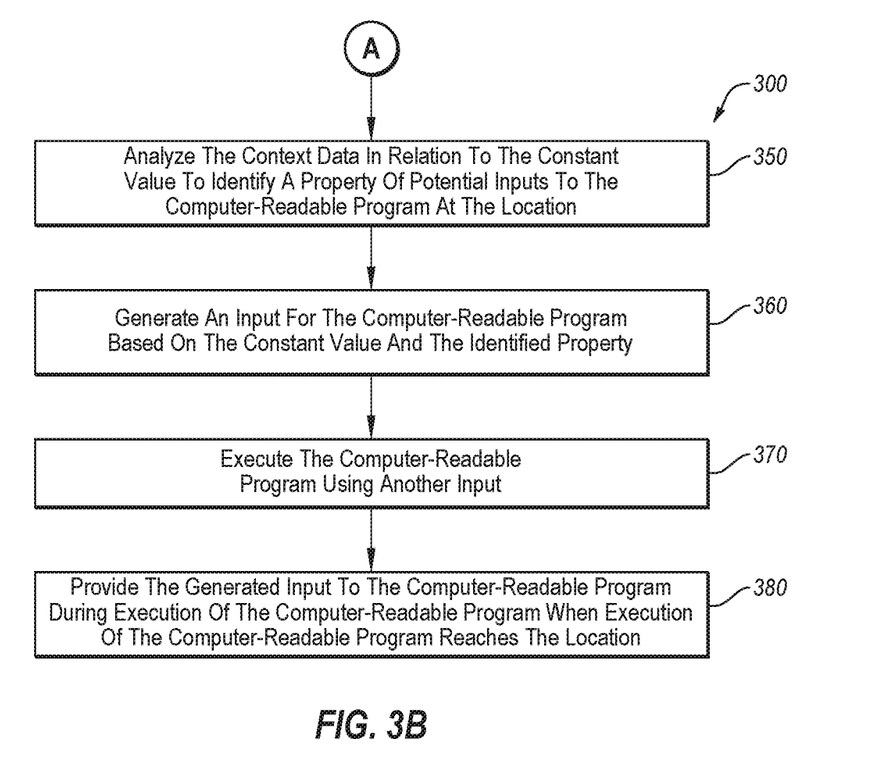

FIGS. 3A-B include a flow chart of an example method 300 to generate inputs for automated computer-program testing operations, according to at least one embodiment described in this disclosure. In some embodiments, one or more of the operations associated with the method 300 may be performed by the environment 100 of FIG. 1 or as part of the environment 200 of FIG. 2. The method 300 may be performed by any suitable system, apparatus, or device. For example, the computing system 400 of FIG. 4 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

With reference to FIG. 3A, at block 310, a computer-readable program may be obtained. The computer-readable program 102 of FIGS. 1 and 2 may be an example of the computer-readable program obtained at block 310.

At block 320, the computer-readable program may be analyzed to identify a constant in code of the computer-readable program. The constant may have a constant value in the code of the computer-readable program. For example, the constant may be initialized to the constant value. In some embodiments, the constant may be identified by analyzing a read-only-data section of disassembly code of the computer-readable program to identify the constant in the read-only-data section. The constants 212 of FIG. 2 may be an example of the constant identified in block 320.

At block 330, context data associated with the constant may be obtained from a portion of the code that includes an occurrence of the constant. The occurrence of the constant may be identified and lines of code adjacent to the occurrence of the constant may be identified. The identified lines of code may be analyzed to determine the context data. Additionally or alternatively, the lines of code may be included in the context data. The context data 222 of FIG. 2 may be an example of the context data obtained at the block 330.

At block 340, a location in the computer-readable program of the occurrence of the constant may be determined. The locations 252 of FIG. 2 may be an example of the location obtained at the block 340.

Blocks 342, 344, and 346 may include an example of operations that may be performed to determine a location in the computer-readable program of the occurrence of the constant.

At block 342, a control-flow graph of the computer-readable program may be obtained. The control flow graph may be generated using any suitable means. The control-flow graph 242 of FIG. 2 may be an example of the control-flow graph obtained at the block 342.

At block 344, the control-flow graph may be analyzed to determine a subset of basic blocks of the control-flow graph that depend on an input to the computer-readable program. For example, a taint analysis may be performed on the computer-readable program and/or the control-flow graph to determine the subset of basic blocks.

At block 346, a basic block of the control-flow graph may be obtained that includes an occurrence of the constant. The basic block may be obtained from the subset of basic blocks determined at the block 344.

With reference to FIG. 3B, at block 350, the context data may be analyzed in relation to the constant to identify a property of potential inputs to the computer-readable program at the location. The properties 232 of FIG. 2 may be an example of the properties identified at the block 350.

At block 360, an input for the computer-readable program may be generated based on the constant value and the property identified at block 350. The property may be related to the way in which the input is based on the constant value. For example, the property may indicate that the constant value defines a number of characters in an input. The input generated may include the number of characters.

At block 370, the computer-readable program may be executed using another input. The other input may be obtained from any suitable source. For example, the other input may be randomly generated or based on known valid inputs, for example, from documentation of the computer-readable program.

At block 380, the input generated at block 360 may be provided to the computer-readable program during execution of the computer-readable program when the execution of the computer-readable program reaches the location identified at block 340. For example, the input generated at block 360 may be related to the location identified at block 340. When the execution that began at block 370 reaches the location related to the input generated at block 360, the input may be provided to the ongoing execution.

In some embodiments, block 370 may occur before block 360. In these and other embodiments, the input generated at block 360 may be generated based on a location reached by the execution of block 370. For example, in response to the execution reaching a location identified at block 340, an input may be generated at block 360. The input generated at block 360 may be provided to an ongoing execution of the computer-readable program, for example, the execution of block 370. Additionally or alternatively, the input generated at block 360 may be used during a new execution of the computer-readable program.

In some embodiments, the input generated at block 360 may be provided to an execution of the computer-readable program that begins independently from the execution that began at block 370. For example, an execution trace of the execution of the computer-readable program that began at block 370, may be obtained. The execution that began at block 370 may or may not have terminated. The input generated at the block 360 may be based on the execution trace. In these or other embodiments, the input generated at block 360 may include a new input portion based on the constant value and the property identified at the block 350. The input may also include a portion based on another input, for example, the other input of block 370 as included in the execution trace.

In some embodiments, reaching the location may include reaching the location and not exiting the location for a threshold duration of time. For example, the execution of the computer-readable program may expect a valid input at the location. The execution of the computer-readable program that began at the block 370 may reach the location and may attempt to provide an input. If the input is not accepted, the execution of the computer-readable program may not exit the basic block. If the execution of the computer-readable program does not exit the basic block for a threshold duration of time, the execution may be provided with another input, for example, the input generated at the block 360.

Modifications, additions, or omissions may be made to the method 300 without departing from the scope of the present disclosure. For example, in some embodiments, the blocks 342, 344, and 346 may be omitted. Further, the order of operations may vary according to different implementations.

FIG. 4 is a block diagram of an example computing system 400, which may be according to at least one embodiment described in this disclosure. As illustrated in FIG. 4, the computing system 400 may include a processor 402, a memory 404, a data storage 406, and a communication unit 408.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 402 may include any number of processors distributed across any number of network or physical locations that are configured to perform individually or collectively any number of operations described herein. In some embodiments, the processor 402 may interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into the memory 404, the processor 402 may execute the program instructions, such as instructions to perform one or more operations described with respect to the environment 100 of FIG. 1, the environment 200 of FIG. 2, and/or of the method 300 of FIG. 3.

The memory 404 and the data storage 406 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 402. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 408 may be configured to receive a computer-readable program and/or one or more inputs, such as the computer-readable program 102 and the inputs 132 of FIG. 1, and to provide the computer-readable program or the inputs to the data storage 406. The communication unit 408 may be configured to receive records, data sets, and/or hypothetical data sets and to provide the records, data sets, and/or hypothetical data sets to the data storage 406. The communication unit 408 may include any device, system, component, or collection of components configured to allow or facilitate communication between the computing system 400 and a network. For example, the communication unit 408 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication unit 408 may permit data to be exchanged with any such as a cellular network, a Wi-Fi network, a MAN, an optical network, etc., to name a few examples, and/or any other devices described in the present disclosure, including remote devices.

Modifications, additions, or omissions may be made to the computing system 400 without departing from the scope of the present disclosure. For example, the data storage 406 may be located in multiple locations and accessed by the processor 402 through a network.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, use of the term "and/or" in some places does not mean that the term "or" should be understood to only include either of the terms as opposed to including the possibility of both terms.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a computer-readable program;
   analyzing the computer-readable program to identify a constant in code of the computer-readable program, the constant having a constant value in the code of the computer-readable program;
   obtaining context data associated with the constant, the context data obtained from an analysis of lines of code adjacent to an occurrence of the constant;
   determining a location of a basic block in the computer-readable program that includes the occurrence of the constant, the basic block requesting an input value;
   analyzing the context data in relation to the constant value to identify a property of potential input values to the computer-readable program at the location;
   generating an input value for the basic block in the computer-readable program using the constant value and the identified property, the input value designed to test functionality of the computer-readable program by being processed by the computer-readable program during execution of the computer-readable program;
   executing the computer-readable program; and
   testing functionality of the computer-readable program by automatically providing the generated input value to the location of the basic block in the computer-readable program during execution of the computer-readable program,
   wherein the computer-readable program processes the generated input value, the generated input value being automatically provided in response to the executing computer-readable program requesting an input value after execution of the computer-readable program reaches the location of the basic block and without changing the constant value of the constant in the code of the computer-readable program.

2. The method of claim 1, wherein analyzing the computer-readable program comprises analyzing a read-only-data section of disassembly code of the computer-readable program and identifying the constant in the read-only-data section.

3. The method of claim 1, wherein determining the location comprises:
   obtaining a control-flow graph of the computer-readable program; and
   obtaining a basic block of the control-flow graph that includes the occurrence of the constant, wherein the execution of the computer-readable program reaching the location comprises the execution of the computer-readable program executing the basic block.

4. The method of claim 3, further comprising analyzing the control-flow graph to determine a subset of basic blocks of the control-flow graph that depend on an input value to the computer-readable program, wherein the obtaining the basic block comprises obtaining the basic block from among the subset of basic blocks.

5. The method of claim 1, wherein analyzing the context data comprises using a machine-learning technique to identify the property, wherein the identified property includes one or more of: an input value length, a numerical range, and an input value format, and wherein the generated input value includes one or more of: a length based on the input value length, a number based on the numerical range, and a part of the generated input value formatted based on the input value format.

6. The method of claim 1, further comprising executing the computer-readable program using another input value, wherein generating the input value occurs in response to the execution of the computer-readable program using the other input value to reach the location.

7. The method of claim 6, further comprising continuing the execution of the computer-readable program using the other input value by providing the generated input value to the ongoing execution of the computer-readable program.

8. The method of claim 6, wherein generating the input value is further based on the other input value; and the method further comprises beginning a second execution of the computer-readable program using the generated input value.

9. The method of claim 8, wherein the generated input value includes the other input value and a new input value portion based on the constant value and the identified property.

10. One or more non-transitory computer-readable media that include instructions that when executed by one or more processors perform operations, the operations comprising:
obtaining a computer-readable program;
analyzing the computer-readable program to identify a constant in code of the computer-readable program, the constant having a constant value in the code of the computer-readable program;
obtaining context data associated with the constant, the context data obtained from an analysis of lines of code adjacent to an occurrence of the constant;
determining a location of a basic block in the computer-readable program that includes the occurrence of the constant, the basic block requesting an input value;
analyzing the context data in relation to the constant value to identify a property of potential input values to the computer-readable program at the location;
generating an input value for the basic block in the computer-readable program using the constant value and the identified property, the input value designed to test functionality of the computer-readable program by being processed by the computer-readable program during execution of the computer-readable program;
executing the computer-readable program; and
testing functionality of the computer-readable program by automatically providing the generated input value to the location of the basic block in the computer-readable program during execution of the computer-readable program,
wherein the computer-readable program processes the generated input value, the generated input value being automatically provided in response to the executing computer-readable program requesting an input value after execution of the computer-readable program reaches the location of the basic block and without changing the constant value of the constant in the code of the computer-readable program.

11. A system including one or more processors and one or more computer-readable media, the system configured to perform operations comprising:
obtaining a computer-readable program;
analyzing the computer-readable program to identify a constant in code of the computer-readable program, the constant having a constant value in the code of the computer-readable program;
obtaining context data associated with the constant, the context data obtained from an analysis of lines of code adjacent to an occurrence of the constant;
determining a location of a basic block in the computer-readable program that includes the occurrence of the constant, the basic block requesting an input value;
analyzing the context data in relation to the constant value to identify a property of potential input values to the computer-readable program at the location;
generating an input value for the basic block in the computer-readable program using the constant value and the identified property, the input value designed to test functionality of the computer-readable program by being processed by the computer-readable program during execution of the computer-readable program;
executing the computer-readable program; and
testing functionality of the computer-readable program by automatically providing the generated input value to the location of the basic block in the computer-readable program during execution of the computer-readable program,
wherein the computer-readable program processes the generated input value, the generated input value being automatically provided in response to the executing computer-readable program requesting an input value after execution of the computer-readable program reaches the location of the basic block and without changing the constant value of the constant in the code of the computer-readable program.

12. The system of claim 11, wherein analyzing the computer-readable program comprises analyzing a read-only-data section of disassembly code of the computer-readable program and identifying the constant in the read-only-data section.

13. The system of claim 11, wherein determining the location comprises:
obtaining a control-flow graph of the computer-readable program; and
obtaining a basic block of the control-flow graph that includes the occurrence of the constant, wherein the execution of the computer-readable program reaching the location comprises the execution of the computer-readable program executing the basic block.

14. The system of claim 13, the operations further comprising analyzing the control-flow graph to determine a subset of basic blocks of the control-flow graph that depend on an input value to the computer-readable program, wherein the obtaining the basic block comprises obtaining the basic block from among the subset of basic blocks.

15. The system of claim 11, wherein analyzing the context data comprises using a
machine-learning technique to identify the property, wherein the identified property includes one or more of: an input value length, a numerical range, and an input value format, and wherein the generated input value includes one or more of: a length based on the input value length, a number based on the numerical range, and a part of the generated input value formatted based on the input value format.

16. The system of claim 11, the operations further comprising executing the computer-readable program using another input value, wherein generating the input value occurs in response to the execution of the computer-readable program using the other input value to reach the location.

17. The system of claim 16, the operations further comprising continuing the execution of the computer-readable program using the other input value by providing the generated input value to the ongoing execution of the computer-readable program.

18. The system of claim 16, wherein generating the input value is further based on the other input value; and the operations further comprise beginning a second execution of the computer-readable program using the generated input value.

19. The system of claim 18, wherein the generated input value includes the other input value and a new input value portion based on the constant value and the identified property.

20. The system of claim 11, wherein the execution of the computer-readable program reaching the location comprises the execution reaching the location and not exiting the location for a threshold duration of time.

* * * * *